United States Patent Office 3,498,767
Patented Mar. 3, 1970

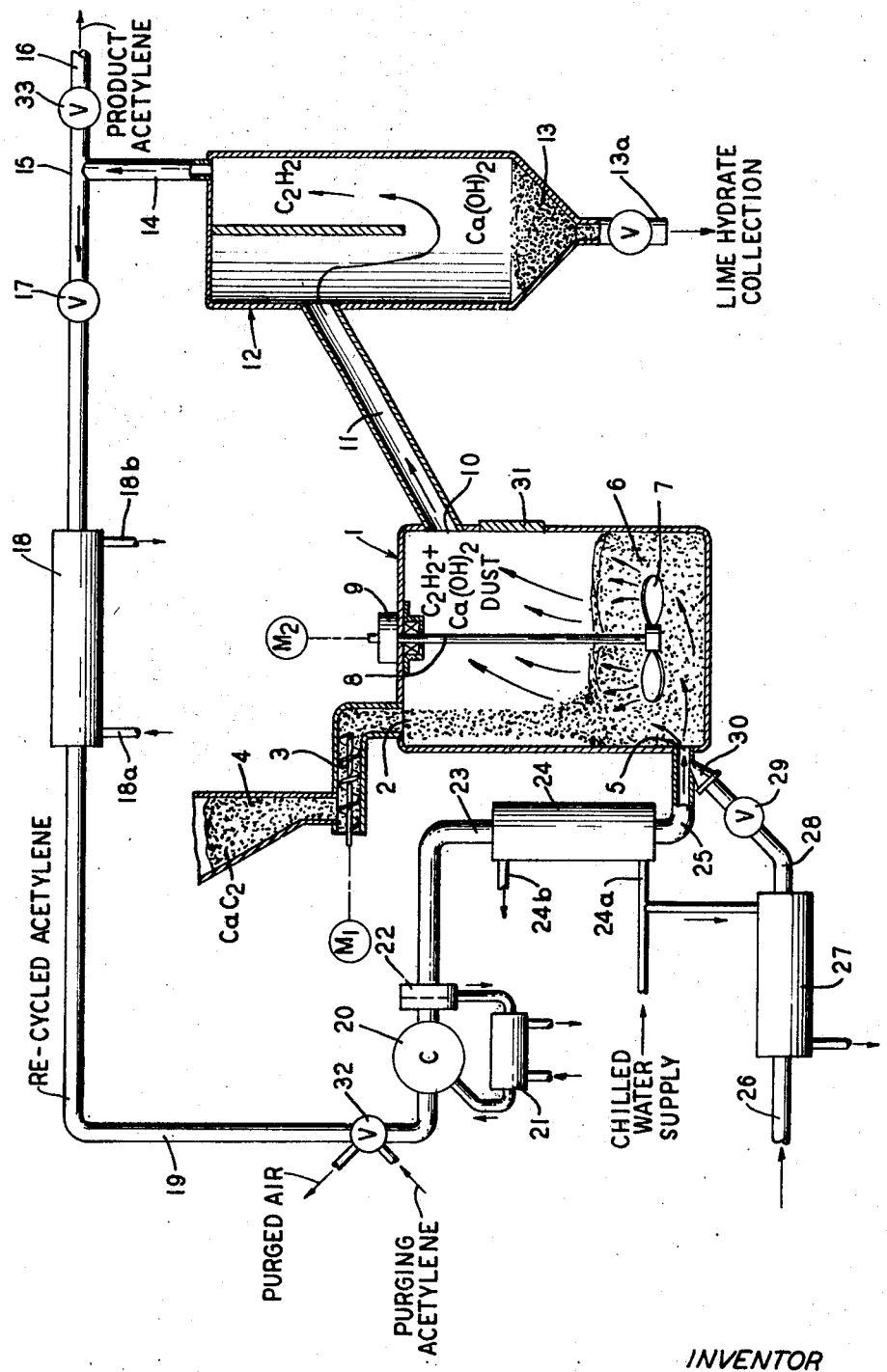

3,498,767
METHOD OF AND APPARATUS FOR
GENERATING ACETYLENE
Kenneth M. Foster, Arlington, N.J., assignor to Air Reduction Company, Incorporated, New York, N.Y., a corporation of New York
Filed Aug. 7, 1967, Ser. No. 658,919
Int. Cl. C10h 15/14, 19/00; C07c 11/24
U.S. Cl. 48—38    12 Claims

ABSTRACT OF THE DISCLOSURE

Apparatus for "dry" generation of acetylene in limited quantity comprises an enclosed reaction vessel having an intake feed for calcium carbide at its upper part, and an intake feed for chilled water mist and cooled re-cycled acetylene at its lower part. A motor-driven rotary stirring element for actively mixing the calcium carbide, water mist and re-cycled acetylene, is centrally located at the lower part of the vessel immediately above the level at which the water mist and re-cycled acetylene are admitted under blower pressure. The stirring element promotes reaction between the calcium carbide and water mist, and also separates the lime hydrate as dust, from the carbide. The blower pressure carries the dustladen acetylene upward in the vessel to a product outlet duct, that in turn leads to a dust collector for removing the lime hydrate. A part of the acetylene after dust separation, is re-cycled through cooling means to a compressor of the water-seal type having its output connected through additional cooling means to the lower intake. The chilled water mist flows into the lower intake together with cooled re-cycled acetylene so that the combined cooling effect limits reaction temperature within the vessel.

---

This invention relates to "dry" generation of acetylene, and in particular to an improved method and apparatus for dry generation of acetylene in small plants.

Uses of so-called "wet" and "dry" generation of acetylene in various forms are well-known in the art. In brief, "wet" generation involves combining calcium carbide with an excess of water and agitating the mixture for obtaining rapid generation of acetylene by exothermic reaction. The residue, namely lime hydrate and water is generally pumped into sludge ponds or the like. Although this method may be useful for rapid, large scale generation of acetylene due mainly to its inherent limitation on excessive reaction temperature, it is too wasteful for the economical operation of small plants, as ready recovery of the lime hydrate, a saleable by-product from the sludge is not practical.

Various methods of "dry" generation have been proposed wherein the addition of reaction water is limited, mainly for the purpose of readily reclaiming the lime hydrate in dry saleable form. These methods for the most part involve multiple stages of carbide-water reaction requiring complicated and expensive equipment including temperature control systems and are not feasible for small scale acetylene generation.

A principal object of this invention therefore is an improved and simplified single-stage system for dry generation of acetylene that is capable of efficiently producing product acetylene and dry saleable lime hydrate readily and at low cost.

Another object of the invention is an improved and simplified system for limiting the build-up of dry generation reaction temperature, by cooling and re-cycling a portion of the generated acetylene through the reacting material.

Another object of the invention is an improved acetylene dry generator having a single-stage reaction vessel wherein the calcium carbide is vigorously stirred and agitated, and the reaction water is added thereto as chilled mist in limited quantity.

Another object of the invention is a simplified method of reclaiming lime hydrate in a dry generation system of the character above, wherein the re-cycled acetylene and reaction water mist are blown into the mass of agitated carbide, and the lime hydrate is carried off as dust by the outgoing stream of acetylene.

In accordance with the invention in a simple embodiment thereof, calcium carbide is fed to a closed reaction tank where it is subjected to vigorous stirring by an impeller or the like, coincident with pressure injection of chilled water mist and re-cycled acetylene both preferably at a level below the impeller. The chilled mist and re-cycled acetylene limit reaction heat build-up in the tank, and the acetylene flowing from the tank carries with it lime hydrate dust that is separated from the reacting carbide particles by impeller action. The hydrate dust is readily separated from the product acetylene as a saleable product.

The invention will be more fully set forth in the following description referring to the accompanying drawing, and the features of novelty will be pointed out with particularity in the claims annexed to and forming a part of this specification.

The single figure of the drawing is a partly schematic illustration of system apparatus embodying the present invention for "dry" generation of the acetylene.

The apparatus disclosed has specific application to comparatively small-scale, low cost production of acetylene by "dry" generation. The generating or reaction vessel comprises a metal tank 1, preferably of a ferrous alloy such as stainless steel, within which calcium carbide, $CaC_2$, and water vapor, $H_2O$, react in known manner to produce acetylene, $C_2H_2$, and lime hydrate $Ca(OH)_2$. At its upper part, the tank has an intake feed opening 2 for receiving the calcium carbide supply. The feed apparatus may be of any conventional type suitable for delivering the carbide to the tank at a required rate, and, as shown, includes a power-driven conveyor worm 3 that receives calcium carbide $CaC_2$ from a hopper 4. The worm 3 is indicated as connected to a motor $M_1$ for progressively moving the carbide supply to the intake opening 2 and into the reaction tank.

The tank near its lower end has a second intake opening 5 for feed of the reaction water (in the form of chilled mist or atomized spray) to the carbide mass 6 that has accumulated in the tank. The water mist as described later, is directed by blower pressure through the intake opening 5 transversely into the carbide near the bottom of the tank; accordingly, as the mist moves upwardly in the tank under the blower pressure, it tends to permeate the entire carbide mass for starting the reaction referred to above. A carbide-water mist reaction in equipment so far described would be too slow for most purposes; also a comparatively large residue of lime hydrate would remain in the reaction tank where it would be difficult to reclaim for commercial use.

These disadvantages, and others, are overcome in accordance with the invention, by vigorously stirring the reaction mass at a level generally somewhat above or near that at which the water mist is blown into the low part of the reaction tank. The stirring action preferably involves rotary motion in a horizontal plane such that a vertical thrust component is produced for supplementing the blower pressure. Thus, the water mist is brought into maximum contact with the surfaces of the carbide particles, which in turn are further broken down by the stirring action.

An efficient stirring device for this purpose comprises an impeller 7 of suitable pitch, having a drive shaft 8 journaled as required in the tank structure and connected to a motor indicated at $M_2$. The motor may be of any suitable constant-speed type operable for example, at about 1800 r.p.m. Depending on the impeller characteristics, the motor can be connected to the shaft 8 through a gear box at 9, or directly, for a small-diameter impeller, as in the manner of a well-known high-speed "blender."

In addition to accelerating the carbide-water mist reaction by vigorous stirring and mixing, the mechanical action of the impeller also tends to pulverize the carbide and to loosen the lime hydrate as rapidly as it forms on the surface of the carbide particles during the reaction. The hydrate is thereby continuously separated as dry dust from the carbide itself. This lime hydrate dust, $Ca(OH)_2$, together with the generated acetylene is blown toward the upper part of the reaction tank from which the now dustladen acetylene flows through an outlet opening 10 into a duct 11 that leads to a dust separator 12 of conventional type. The impeller is preferably positioned near the tank bottom, as generally indicated.

In the separator the dry lime hydrate dust settles as indicated at 13, at the bottom of the separator, from which it is drawn off at 13a and bagged for commercial use. The now dust-free acetylene flows from the top of the separator at the outlet 14 to a main duct 15 where a part of the acetylene flows at 16 to product collector tanks, and another part, as determined by setting of the valve 17, is cooled and re-cycled for re-entry under blower pressure to the reaction tank along with the water mist at he intake 5.

The re-cycled aceylene in the main duct 15 is first passed through a conventional gas cooler 18 that is supplied by circulating cooling water at 18a and 18b. The cooler outlet connects with a duct 19 that leads to a low pressure compressor-blower 20 of the so-called "Nash," or liquid-seal type. A detailed description of the compressor is unnecessary here, other than to state that a water fed cooler 21 is connected across the compressor and its liquid seal and separator 22. The liquid seal introduces some additional water vapor to the recycled acetylene. The resulting gas and vapor mixture then flows from the compressor outlet duct 23 at about 2 p.s.i.g. to another gas cooler unit 24. This cooler is fed by circulating chilled water at 24a and 24b so that the now moistened recycled acetylene is effectively chilled as it flows from the cooler outlet 25 to merge with the principal supply of reaction water mist at the intake 5.

The reaction water from the supply line 26 is chilled in a cooler 27 of the type described above, the outlet 28 of which connects as indicated with the intake 5. The reaction water supply may be at main pressure, and its rate of flow may be adjusted by a valve 29 or the like. A spray or atomizing device 30 can be used for injecting the chilled mist into the pressurized gas stream at the intake 5.

Operation

The dry generation equipment is put in operation by first purging the tank and system of air, etc., by an auxiliary supply of acetylene that is introduced into any suitable manner, as by a valve coupling 32 at the compressor intake. During the purge, the outlet valve 33 is closed and the air expelled at the valve coupling. Carbide in sufficient quantity is admitted to cover in depth the impeller 7 as generally indicated at 6 in the drawing. The compressor 20 is energized for establishing blower pressure, the chilled water mist from the cooler 27 is turned on, and the impeller motor $M_2$ started for agitating the mixture and initiating the reaction by bringing the water mist into intimate contact with the individual carbide particles. The acetylene so formed by the resulting exothermic reaction, and the lime hydrate dust that is freed by impeller action are blown upward by the joint action of impeller and compressor, into the tank space above the carbide mass. The acetylene as it flows under low pressure into the separator 12 carries with it the hydrate dust. Excess heat in the reaction tank produced during the exothermic reaction is partly compensated by the cooling effect of the incoming chilled mist before it reaches the reaction phase; additional cooling by the recycled chilled acetylene serves to maintain the tank temperature at a tolerable limit. The control factors determining the tank temperature can be varied as required and include primarily, (1) the rate of carbide feed, (2) the rate of injection of the chilled water mist consistent with "dry" generation, and (3) the proportion of the acetylene that is recycled for cooling purposes. By adjusting these factors to suit the heat dissipating characteristics of the reaction tank, acetylene can be economically generated practically continuously for commercial use at normal reaction tank temperatures.

The calcium carbide supply may be fed from the hopper 4 to the reaction tank in separate batches or at a uniform rate as desired, according to production requirements. The reacting material is preferably maintained at a substantially constant level at the lower part of the tank for limited reaction heat build-up; any accumulation of waste residue in the tank is removed through the tank clean-out door 31 during routine maintenance.

The economic use of the invention is enhanced by the simplicity of the equipment required and its adaptability to small acetylene generating plants now in common use. The dry generation method employed eliminates any need for sludge ponds, and large volume storage tanks and bins, and the self-contained system provides a very simple arrangement for directly bagging for shipment the saleable lime hydrate.

It should be understood that this invention is not limited to specific details of construction and arrangement thereof herein illustrated, and that changes and modifications may occur to one skilled in the art without departing from the spirit of the invention.

I claim:
1. The method of producing acetylene by dry generation which comprises:
   (a) feeding calcium carbide to a reaction vessel,
   (b) injecting a chilled water mist into the carbide for dry generation of acetylene,
   (c) stirring the mixture of carbide and mist actively for promoting reaction and for separating the resulting lime hydrate as dust,
   (d) blowing the generated acetylene and dust from the reaction vessel,
   (e) separating the dust from the product acetylene, and
   (f) re-cycling and cooling part of the product acetylene for re-entry to the vessel.

2. The method as specified in claim 1 wherein the quantity of carbide feed is limited to small mass accumulation in the reaction vessel with respect to its capacity, and the chilled water mist and re-cycled acetylene are blown into the carbide mass.

3. The method as specified in claim 1 wherein the recycled acetylene is cooled, compressed and re-cooled prior to reentry to the reaction vessel.

4. The method as specified in claim 2 wherein the chilled water mist and recycled acetylene are blown into the reaction vessel beneath the region of active stirring.

5. The method as specified in claim 4 wherein the stirring motion is rotary and imparts vertical movement to the generated acetylene and dust supplementing the blowing action.

6. The method as specified in claim 4 wherein the chilled water mist and re-cycled acetylene are mixed for common entry to the reaction vessel.

7. Apparatus for producing acetylene by dry generation comprising:
   (a) a closed reaction vessel,
   (b) means for feeding calcium carbide to the vessel, (c) means for injecting a chilled water mist into the carbide deposited in the vessel for dry generation of acetylene, (d) stirring means positioned within the deposited carbide for promoting reaction and for reducing the resulting lime hydrate to dust, (e) means for blowing the generated acetylene and dust from the reaction vessel and into a dust separator, and (f) means for re-cycling part of the dust-free product acetylene from the separator through cooling means for re-entry to the vessel.

8. Apparatus as specified in claim 7 wherein the chilled water mist and re-cycled acetylene are fed to the reaction vessel beneath the stirring means.

9. Apparatus as specified in claim 7 wherein the stirring means is a rotary impeller positioned for producing thrust in direction supplementing the action of the blowing means.

10. Apparatus as specified in claim 7 wherein a compressor receives the re-cycled acetylene for blowing it into the reaction vessel, and gas cooling means is connected between the compressor outlet and the vessel.

11. Apparatus as specified in claim 10 wherein the injected chilled water mist and re-cycled acetylene enter the reaction vessel at a common intake subject to compressor pressure.

12. Apparatus for producing acetylene by dry generation comprising:

(a) a closed reaction tank, (b) conveyor means for feeding carbide to the tank, (c) means for feeding reaction water as mist to the tank, (d) means for chilling the mist prior to its entry in the tank, (e) a motor-operated rotary stirring device for vigorously agitating the carbide and mist mixture in the tank for promoting the reaction and freeing lime hydrate as dust from the carbide, (f) means for cooling and re-cycling a part of the generated acetylene including a compressor for blowing the cooled re-cycled acetylene through the carbide within the tank, (g) the compressor causing generated acetylene and lime hydrate dust produced during the reaction, and the re-cycled acetylene to flow from the tank, (h) a dust separator for receiving the flow, (i) and means for controlling the amount of dust-free acetylene from the separator for re-cycling.

References Cited

UNITED STATES PATENTS

| | | | |
|---|---|---|---|
| 2,343,185 | 2/1944 | Holm et al. | 48—216 |
| 2,951,748 | 9/1960 | Murphy et al. | 48—38 |
| 3,077,390 | 2/1963 | List et al. | 48—38 X |

MORRIS O. WOLK, Primary Examiner

R. E. SERWIN, Assistant Examiner

U.S. Cl. X.R.

48—1, 54, 216